United States Patent Office 2,941,004
Patented June 14, 1960

2,941,004
1,5-BIS-DIMETHYLAMINO-3-PENTANOL DIETHOBROMIDE

Ellis Rex Pinson, Jr., and Gerald D. Laubach, Jackson Heights, N.Y., assignors to Chas. Pfizer & Co., Inc., New York, N.Y., a corporation of Delaware No Drawing. Filed May 19, 1955, Ser. No. 509,677

1 Claim. (Cl. 260—567.6)

This invention is concerned with a new class of highly effective therapeutic agents and certain intermediates in their preparation. In particular, these compounds are the diquaternary salts of certain oxygen substituted derivatives of a group of N,N,N',N'-tetrasubstituted polymethylenediamines.

Various agents of the diquaternary ammonium type have been suggested from time to time in the past for use in the therapy of hypertension. It has long been held that these materials function by blocking autonomic nerve impulses at the ganglia. However, recent work indicates that this may not be the only mode of action of these agents. At any rate, the diquaternary ammonium salts of this invention are distinctly superior for this type of use.

In particular, the tertiary diamino compounds from which the diquaternary salts of this invention are prepared may be represented by the following structural formula

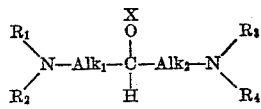

wherein $Alk_1$ and $Alk_2$ are straight or branch chained lower alkylene groups each having not more than six carbon atoms and such that the total number of carbon atoms in a straight chain between the two nitrogen atoms of said diamino compound is from five to eight;

and

each being selected from the group consisting of a lower dialkylamino group each of whose alkyl groups contains not more than three carbon atoms, a lower dialkylamino group at least one of whose alkyl groups is a two to three carbon atom β-hydroxyalkyl group and esters and ethers thereof, and a saturated monocyclic heterocyclic amino radical; and X is selected from the group consisting of a hydrogen atom, a lower alkyl group having not more than six carbon atoms, an aralkyl group, an aryl group, an acyl group, an aroyl group, an N-alkylcarbamyl group, and an N-arylcarbamyl group.

In the foregoing structural formula $R_1$, $R_2$, $R_3$ and $R_4$ may be the methyl, ethyl, propyl or isopropyl groups or a β-hydroxyalkyl group having two to three carbon atoms or an ester or ether thereof. Examples of such groups are the β-hydroxyethyl, β-hydroxypropyl, β-acetoxyethyl, β-benzoxypropyl, β-propionoxyethyl, β-butoxypropyl, β-ethoxyethyl groups, etc. $R_1$ and $R_2$, and $R_3$ and $R_4$ may also be joined to form a monocyclic saturated heterocyclic amino radical such as the pyrrolidino, piperidino, or morpholino groups. Either pair or both pairs of these alkyl groups may be so joined to form heterocyclic groups. X is a hydrogen atom; a lower alkyl group having not more than six carbon atoms such as methyl, ethyl, butyl, or hexyl; an aralkyl group such as benzyl or benzhydryl; an aryl group such as phenyl, toluyl, or naphthyl, an acyl group such as acetyl, butyryl, or valeryl; an aroyl group such as benzoyl, or naphthoyl, an N-alkylcarbamyl group such as N-ethylcarbamyl or N-butylcarbamyl, or an N-arylcarbamyl group such as N-phenylcarbamyl or N-(α-naphthyl)carbamyl.

$Alk_1$ and $Alk_2$ are lower alkylene groups with straight or branched chains such as methylene, ethylene, ethylidene, propylidene, propylene, trimethylene, hexamethylene, butylene and isobutylene. They may be the same or different. However, $Alk_1$ and $Alk_2$ are so constituted that the total number of carbon atoms in a straight chain between the nitrogen atoms is from five to eight that is the sum of the carbon atoms in a straight chain in $Alk_1$ and $Alk_2$ is from four to seven. This is illustrated by the following structural formula in which the two tertiary amino nitrogen atoms are separated by a straight chain containing five carbon atoms, and the sum of the carbon atoms in a straight chain in $Alk_1$ and $Alk_2$ is four.

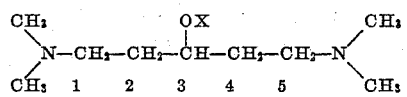

Conversion of these diamino compounds to the active diquaternary ammonium salts of this invention yields compounds having the structure

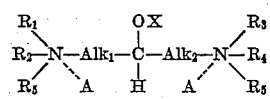

wherein $R_5$ is a lower alkyl group having up to three carbon atoms; A is a pharmacologically acceptable anion such as iodide, chloride, bromide, sulfate, methylsulfate, acetate, propionate, tartrate, citrate, gluconate, etc., and the remaining groups having the same meaning as indicated above.

The above tertiary diamines are useful intermediates in the preparation of the valuable diquaternary ammonium salts of this invention since treatment of them with a quaternizing agent such as an alkyl halide or sulfate yields the desired quaternary salt. Preparation of these diamines can be accomplished by a number of routes. For instance a particularly useful process involves the reduction of a di-β-dialkylaminoethyl ketone with lithium aluminum hydride to yield the corresponding diaminopentanol. Alternatively, the reduction may be carried out catalytically using hydrogen and a noble metal catalyst such as platinum, palladium, or rhodium. The required diamino ketone of this preparation may be prepared by the method of Cardwell and McQuillen, J. Chem. Soc., 1949, p. 708, and 1950, p. 1056. The complete process is illustrated by the following equations.

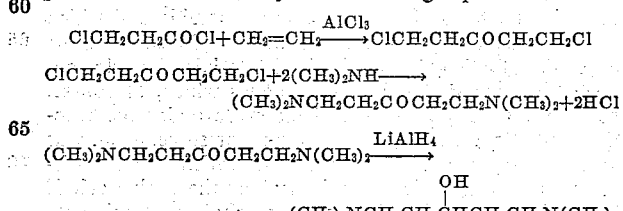

The diquaternary ammonium salts derivable from the above diaminopentanol constitute a particularly useful group of therapeutic agents for the use outlined above.

These are the cases where Alk₁ and Alk₂ of the foregoing generic formula are both ethylene groups.

The above process is readily amenable to the preparation of higher homologs by the use of other chloro substituted acid chlorides. For example, gamma-chlorobutyryl chloride in the above process yields a 1,6-diamino-3-hexanol and delta-chlorovaleryl chloride yields a 1,7-diamino-3-heptanol.

An alternative route to the valuable diaminopentanol intermediate of this invention utilizes the reaction of acetonedicarboxylic acid with an aldehyde and a secondary amine. For example, treatment of acetone dicarboxylic acid with dimethylamine and formaldehyde yields 1,5-bis-dimethylamino-3-pentanol. The condensation and decarboxylation occur in a single step. The resulting ketone can then be reduced as described above.

$$HO_2CCH_2\overset{O}{\overset{\|}{C}}CH_2CO_2H + CH_2O + HN(CH_3)_2 \longrightarrow$$

$$(CH_3)_2NCH_2CH_2\overset{O}{\overset{\|}{C}}CH_2CH_2N(CH_3)_2 + H_2O + CO_2$$

Application of this reaction to other aldehydes and a secondary amine results in the formation of branched chained dialkylaminoalkyl ketones which can be reduced to the corresponding useful diaminopentanol intermediates. This process is represented below wherein R₁ and R₂ have the same meaning as before and R is a lower alkyl or aryl group.

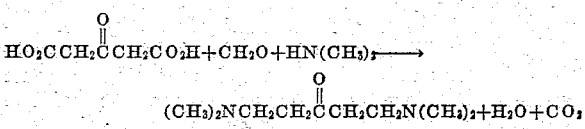

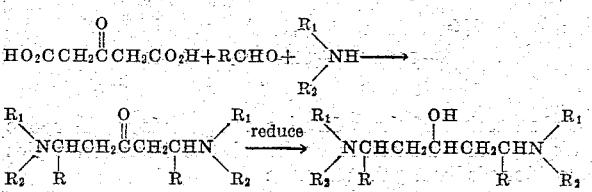

Aldehydes that may be used include aliphatic aldehydes such as acetaldehyde, propionaldehyde, butyraldehyde, or isobutyraldehyde, aromatic aldehydes such as benzaldehyde, chlorobenzaldehyde, toluic aldehyde, α-naphthaldehyde, or β-naphthaldehyde, and araliphatic aldehydes such as phenylacetaldehyde. A preferred embodiment of the invention involves the use of lower aliphatic aldehydes, that is those containing not more than five carbon atoms. As was indicated above various secondary amines may also be employed but, again, a preferred embodiment of the invention involves the use of those amines containing not more than three carbon atoms in each of the alkyl groups. Examples of such amines include dimethylamine, methylethylamine, diethylamine, dipropylamine, piperidine, pyrrolidine, and morpholine.

One useful method for carrying out this process involves treatment of the acetonedicarboxylic acid and the secondary amine hydrochloride in aqueous alcoholic solution, with the aldehyde. The free amine or other acid addition salt thereof may also be used. If the aldehyde is formaldehyde, it is convenient to use absolute alcohol to dissolve the acetonedicarboxylic acid and the amine, and to use a 40% aqueous solution of formaldehyde, which is commercially available, as the source of the aldehyde. The solvents that may be used in this process include those in which all of the reactants are soluble and which will not react under the conditions employed with the amine and aldehyde involved. Materials that do not meet these conditions includes ketones which, of course, will react with the amine and aldehyde under the reaction conditions employed and non-polar solvents such as aromatic and aliphatic hydrocarbons which will not dissolve the acetone dicarboxylic acid or the amine salt if a salt is employed. The lower alcohols and mixtures of water and the lower alcohols have proved to be the most suitable solvents. By lower alcohols is meant those containing not more than about five carbon atoms.

The above diamino alkanols may be converted to the corresponding esters or ethers by standard methods. For example treatment of 1,5-bis-dimethylamino-3-pentanol with an acid anhydride such as acetic anhydride yields the acetate ester. Similarly the use of an acid chloride can be made. Examples of esters include acetates, benzoates, dichlorobenzoates, propionates, naphthoates, butyrates, etc. Ethers may be prepared by treatment of the alkanol with an alkyl halide or sulfate in the presence of a strong base. Thus ethers such as the methyl, ethyl, propyl, butyl, hexyl, and benzyl ethers may be prepared. These processes are illustrated by the following equations:

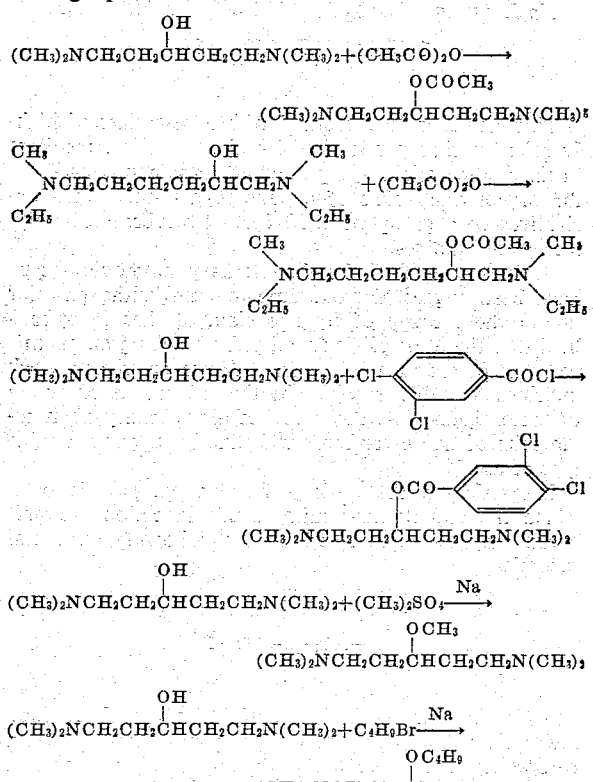

Urethanes can be readily prepared from the above ditertiary amino carbinols very simply by treatment of them with alkyl or arylisocyanates, such as ethylisocyanate, propylisocyanate, butylisocyanate, phenylisocynate, and α-naphthylisocyanate, under anhydrous conditions. Some examples of this type of preparation are given below.

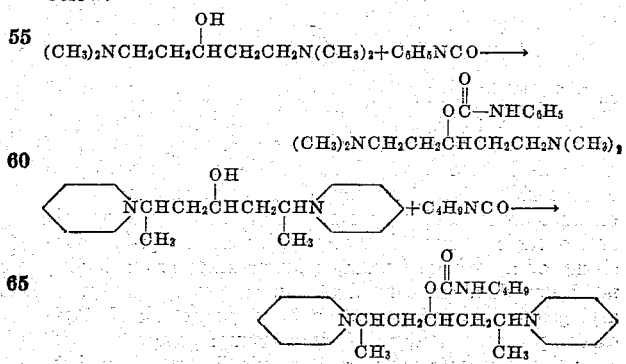

These syntheses are carried out by mixing the two reagents, i.e. the carbinol and the isocyanate in an inert solvent such as benzene, diethyl ether, or dioxane. Materials that will react with isocyanates such as water, and secondary amines must be excluded.

Conversion of the above diamines to the valuable diquaternary ammonium salts of this invention takes place readily by treatment with a quaternizing agent such as an alkyl halide, sulfate, or sulfonate ester either in the presence or absence of a stable organic solvent. A few representative examples are illustrated by the following equations.

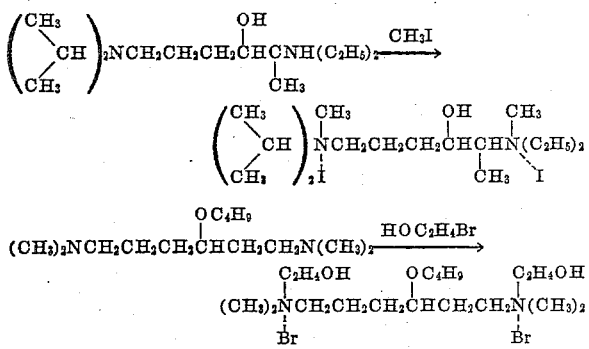

It will be noted from the above description that many of these valuable salts are prepared from the corresponding di-tertiary amines of this invention by treatment with an alkyl halide. Thus the resulting anion is the chloride, bromide, or iodide ion. These compounds may be converted to the salts of other acids by a number of methods. Thus on treatment of the quaternary halide with an aqueous solution of the silver salt of another acid such as silver nitrate or silver acetate, the silver halide is precipitated and the diquaternary di-nitrate or di-acetate is formed.

A further method which is highly useful for this purpose comprises contacting the quaternary halide with a basic ion-exchange resin, preferably a highly basic compound, such as the Rohm & Haas compound Amberlite IRA–400, in the basic form. This resin is a polyquaternary ammonium compound which is prepared by chloromethylating a highly cross-linked copolymer of styrene and divinyl benzene and treatment of the chloromethylated material with a tertiary amine such as trimethylamine. By the use of this resin a quaternary ammonium hydroxide corresponding to a salt of this invention is formed. It is then neutralized with the appropriate acid, for instance, citric acid, tartaric acid, propionic acid, acetic acid, nitric acid, sulfuric acid, and so forth. Alternatively, the resin may be converted by means of the acid, the salt of which it is desired to convert the quaternary salt and the ion-exchange resin is then contacted with an aqueous solution of the alkyl ammonium halide. The salt may then be recovered from the eluate by a number of methods such as evaporation or solvent precipitation.

The following examples are given by way of illustration and are not intended to limit the scope of the invention. In fact, many widely varying embodiments are possible without departing from the spirit and scope of the herein described invention; it is to be understood that this invention is to be limited only by the specific wording of the appended claim. In each of these examples, temperatures are given in degrees centigrade.

EXAMPLE I

*1,5-bis-dimethylamino-3-pentanol*

(1) A solution of 20 g. (0.12 mole) 1,5-bis-dimethylamino-3-pentanone in 100 ml. of absolute ether was added dropwise to a stirred solution of 50 ml. of 1.24 M lithium aluminum hydride diluted with 100 ml. of absolute ether (0.062 mole) at a rate sufficient to cause gentle refluxing. After the addition was complete, the mixture was stirred for one hour at 25° and 5.5 ml. of water was added dropwise in order to decompose the complex and the excess lithium aluminum hydride. A buff-colored granular precipitate formed, which settled well. The ether was decanted and the precipitate washed twice by decantation with 200 ml. of ether. The ether solutions were combined, dried over anhydrous sodium sulfate and evaporated in vacuo yielding 17.52 g. of a colorless oil, which was used without further purification. The infrared spectrum confirmed the identity of the compound.

(2) To a cold solution of 37.8 g. (0.46 mole) of dimethylamine hydrochloride in 200 ml. absolute ethanol was added 34.0 g. (0.2 mole) of acetonedicarboxylic acid with stirring. After all the solid had dissolved 63.29 of 40% aqueous formaldehyde was added dropwise with good stirring. The solution was refluxed for 24 hours and concentrated in vacuo to about 100 ml. The concentrate was diluted with 100 ml. of water and extracted with three 50 ml. portions of chloroform to remove non-basic substances. The aqueous phase was made alkaline with 150 ml. of 30% aqueous potassium carbonate and extracted with five 100 ml. portions of chloroform. The chloroform solution was dried over anhydrous sodium sulfate, the solvent evaporated under reduced pressure and the residue distilled in vacuo. There was obtained 13.3 g. of colorless liquid, B.P. 65–69°/mm. $n_D^{25}$ 1.4423.

The infrared spectra of the materials prepared by these two processes were identical.

EXAMPLE II

*1,5-bis-dimethylamino-3-pentanol di-ethobromide*

One gram of the pentanol of Example I was dissolved in about 5 ml. of acetonitrile and treated with 2 ml. of ethyl bromide. The solution was kept at room temperature overnight during which time a white crystalline precipitate formed. This was collected and washed with fresh acetonitrile and recrystallized from isopropanol to give a white crystalline solid, melting point 286–287°.

EXAMPLE III

*1,5-bis-dimethylamino-3-pentanol acetate*

One gram of 1,5-bis-dimethylamino-3-pentanol was dissolved in 3 ml. of acetic anhydride and the solution was warmed on the steam bath for 15 minutes. After standing for one hour at room temperature, 5 ml. of water was added and the solution was made strongly alkaline with saturated aqueous potassium carbonate. This mixture was diluted with 2 ml. of water and extracted three times with 20 ml. of chloroform. Concentration of the chloroform solution in vacuo left 1.65 g. of a yellow viscous oil which exhibited the typical infrared absorption spectrum of an acetate. This oil was used for the preparation of salt without further purification.

EXAMPLE IV

*1,5-bis-dimethylamino-3-pentanol acetate di-ethiodide*

The acetate of Example III was dissolved in 5 ml. of absolute ethanol and 9.3 ml. of ethyl iodide was added. After standing overnight, the white solid which had precipitated was filtered off, washed with absolute ethanol and dried. The product weighed 1.37 g. and melted at 220–224° with decomposition. After recrystallization from 95% ethanol, the pure methiodide melted at 221.2–221.8° dec.

Analysis.—Calcd. for $C_{15}H_{34}N_2O_2I_2 \cdot H_2O$: C, 33.00; H, 6.61; N, 5.14. Found: C, 33.08; H, 6.44; N, 4.96.

EXAMPLE V

*1,5-bis-dimethylamino-3-pentanol acetate di-β-hydroxyethobromide*

One gram of the acetate of Example III was dissolved in 5 ml. of acetonitrile and treated with 3 ml. of β-hydroxyethylbromide. A white solid separated from the mixture after standing at room temperature for 24 hours which was collected, washed with fresh solvent and dried. The diquaternary ammonium salt was purified by recrystallization from a mixture of ethanol and acetone to yield a white crystalline product, melting at 124.6–125.6°.
Analysis.—Calcd. for $C_{15}H_{34}O_4Br_2$: C, 38.64; H, 7.35.
Found: C, 38.45; H, 7.53.

EXAMPLE VI

1,5-bis-dimethylamino-3-pentanol 3,4-dichlorobenzoate

One gram of 1,5-bis-dimethylamino-3-pentanol was dissolved in 10 ml. of chloroform, and 2.4 ml. of 3,4-dichlorobenzoyl chloride was added. After standing 16 hours, a white solid had formed. The mixture was diluted to 25 ml. with chloroform and extracted twice with 15 ml. of 1 N hydrochloric acid. The combined acid solutions were washed with chloroform and made strongly alkaline with saturated aqueous potassium carbonate. The oil that precipitated was taken up in chloroform, and the chloroform distilled to yield 1.04 g. of a yellow oil which was not further purified.

EXAMPLE VII

1,5-bis-dimethylamino-3-pentanol 3,4-dichlorobenzoate di-ethobromide

Two grams of the dichlorobenzoate of Example VI was dissolved in 7 ml. of acetonitrile and treated with 3 ml. of ethyl bromide. After standing 48 hours at room temperature the precipitated solid was collected and washed with acetonitrile. The crude salt was then purified by recrystallization from a mixture of isopropanol and ethyl acetate. The purified material melted at 220–222°.

EXAMPLE VIII

1,6-bis-methylethylamino-2-hexanol

This compound was obtained by the methylation of N,N'-diethyl-1,6-diamino-2-hexanol which was obtained from Carbide and Carbon Chemicals Corp. Formic acid, 90%, 225 g., was added to 50 g. of the diamine at 0°. The resulting solution was heated to 60° and 165 ml. of 38% formalin was added dropwise during a period of 40 minutes. Carbon dioxide was evolved. The solution was refluxed for 18 hours, then cooled and acidified with 200 ml. of concentrated hydrochloric acid. The acid solution was concentrated in vacuo to a thick syrup which was made strongly alkaline with 200 ml. of 50% aqueous sodium hydroxide. The alkaline solution was extracted four times with 200 ml. of chloroform, and the combined extracts evaporated leaving an amber oil which was purified by distillation.

EXAMPLE IX

1,6-bis-methylethylamino-2-hexanol dimethosulfate

One gram of the hexanol of Example VIII was dissolved in 5 ml. of tetrahydrofuran and treated with 2 ml. of dimethylsulfate. A slight evolution of heat was observed and the mixture was kept at room temperature for about 36 hours after which time the precipitated solid was collected, washed with fresh solvent and dried.

EXAMPLE X

1,6-bis-methylethylamino-2-hexanol acetate

One gram of 1,6-bis-methylethylamino-2-hexanol was dissolved in 3 ml. of acetic anhydride and the solution warmed on the steam bath for about one-half hour. After standing for about three hours at room temperature 5 ml. of water was added and the solution was made strongly alkaline by treatment with saturated aqueous potassium carbonate. This mixture was then extracted with chloroform and chloroform extracts concentrated in vacuo, to leave the acetate ester as a viscous yellow oil which was not further purified.

EXAMPLE XI

1,5-bis-dimethylamino-3-pentanol dibenzylacetate

One gram of 1,5-bis-dimethylamino-3-pentanol was dissolved in 10 ml. of chloroform and 3 ml. of dibenzylacetyl chloride was added. After standing for about 24 hours, a white precipitate had formed. The mixture was diluted to 25 ml. with chloroform and extracted twice with 15 ml. of 1 N hydrochloric acid. The combined acid solutions were washed with chloroform and made strongly alkaline with saturated aqueous potassium carbonate. The resulting oil was taken up in chloroform. Concentration of the chloroform solution yielded the product as a yellow oil. This oil was of adequate quality for use in the preparation of salts.

EXAMPLE XII

1,5-bis-dimethylamino-3-pentanol dibenzylacetate dimethiodide

The dibenzyl acetate of Example XI was treated in acetonitrile with an excess of methyl iodide and kept at room temperature for several days during which time the diquaternary methiodide precipitated. The product was collected, washed with fresh solvent and dried. Recrystallization from absolute ethanol yielded the purified dimethyliodide salt melting point 180–182° dec.

EXAMPLE XIII

1,5-bis-dimethylamino-3-pentanol dibenzyl acetate di-ethiodide

One gram of the dibenzyl acetate of Example XI was dissolved in 5 ml. of acetonitrile and treated with 3 ml. of ethyl iodide. After standing 24 hours at room temperature the precipitated solid was collected, washed with fresh acetonitrile and recrystallized from a mixture of ethanol and isopropanol to give the purified salt. Melting point 16.38–164.6° dec.

What is claimed is:
1,5-bis-dimethylamino-3-pentanol diethobromide.

References Cited in the file of this patent

UNITED STATES PATENTS

| | | |
|---|---|---|
| 2,113,606 | Taub | Apr. 12, 1938 |
| 2,532,277 | Castle | Dec. 2, 1950 |
| 2,636,051 | Whetstone et al. | Apr. 21, 1953 |

FOREIGN PATENTS

| | | |
|---|---|---|
| 30,315 | Austria | Oct. 25, 1907 |
| 517,147 | Belgium | Feb. 14, 1953 |
| 669,823 | Germany | Jan. 5, 1939 |

OTHER REFERENCES

Ingold et al.: "J. Chem. Soc." (London), 1931, pages 1669–76.

Aurisicchio: "Industria Chimica," vol. 8 (1933), pages 442–44.

Gibson et al.: "J. Chem. Soc." (London), 1942, pages 165, 171–72.

Beilstein: "Organische Chemie," vol. IV, 2nd suppl. (1942), page 745.